United States Patent
Peddinghaus

[15] 3,663,005
[45] May 16, 1972

[54] HEADSTOCK
[72] Inventor: Carl Ullrich Peddinghaus, Strasse 268, Wuppertal-Barmen, Germany
[22] Filed: Sept. 22, 1969
[21] Appl. No.: 859,814

[30] Foreign Application Priority Data
Sept. 23, 1968 Germany ............... P 17 28 292.7
Mar. 10, 1969 Germany ............... P 19 12 001.5

[52] U.S. Cl. .................................. 269/247, 269/251
[51] Int. Cl. ................................................ B25b 1/10
[58] Field of Search ............ 269/247, 251, 286; 308/DIG. 5; 74/424.8

[56] References Cited

UNITED STATES PATENTS

| 66,712 | 7/1867 | Jameson | 269/247 |
|---|---|---|---|
| 7,343 | 10/1876 | Barnes | 269/247 X |
| 957,520 | 5/1910 | Stearns | 269/247 X |
| 2,786,726 | 3/1957 | Tarr | 308/DIG. 5 |
| 2,295,332 | 9/1942 | Call | 269/247 |
| 703,376 | 7/1902 | Bingham | 269/247 |

FOREIGN PATENTS OR APPLICATIONS

| 414,579 | 1925 | Germany | 269/286 |
|---|---|---|---|
| 858,489 | 1961 | Great Britain | 269/286 |

Primary Examiner—Andrew R. Juhasz
Attorney—Holman & Stern

[57] ABSTRACT

A headstock with jaws guided parallel to one another, and with a spindle which engages the movable jaw by means of a drivable head, and which engages in a spindle nut which is stationary in relation to the fixed jaw, the spindle being enclosed or surrounded by a guiding tube formed with a longitudinal slot in its under side, in which a web attached to the spindle nut engages, the flanks of this web forming guides for the slides of the slot in the guiding tube.

The guiding tube may be of circular cross-section, or may be of angular cross-section, with a horizontal web at the top and two lateral vertical flanges.

11 Claims, 6 Drawing Figures

PATENTED MAY 16 1972

INVENTOR.
CARL ULLRICH PEDDINGHAUS
BY Holman, Glascock,
Downing & Seebold
ATTORNEYS

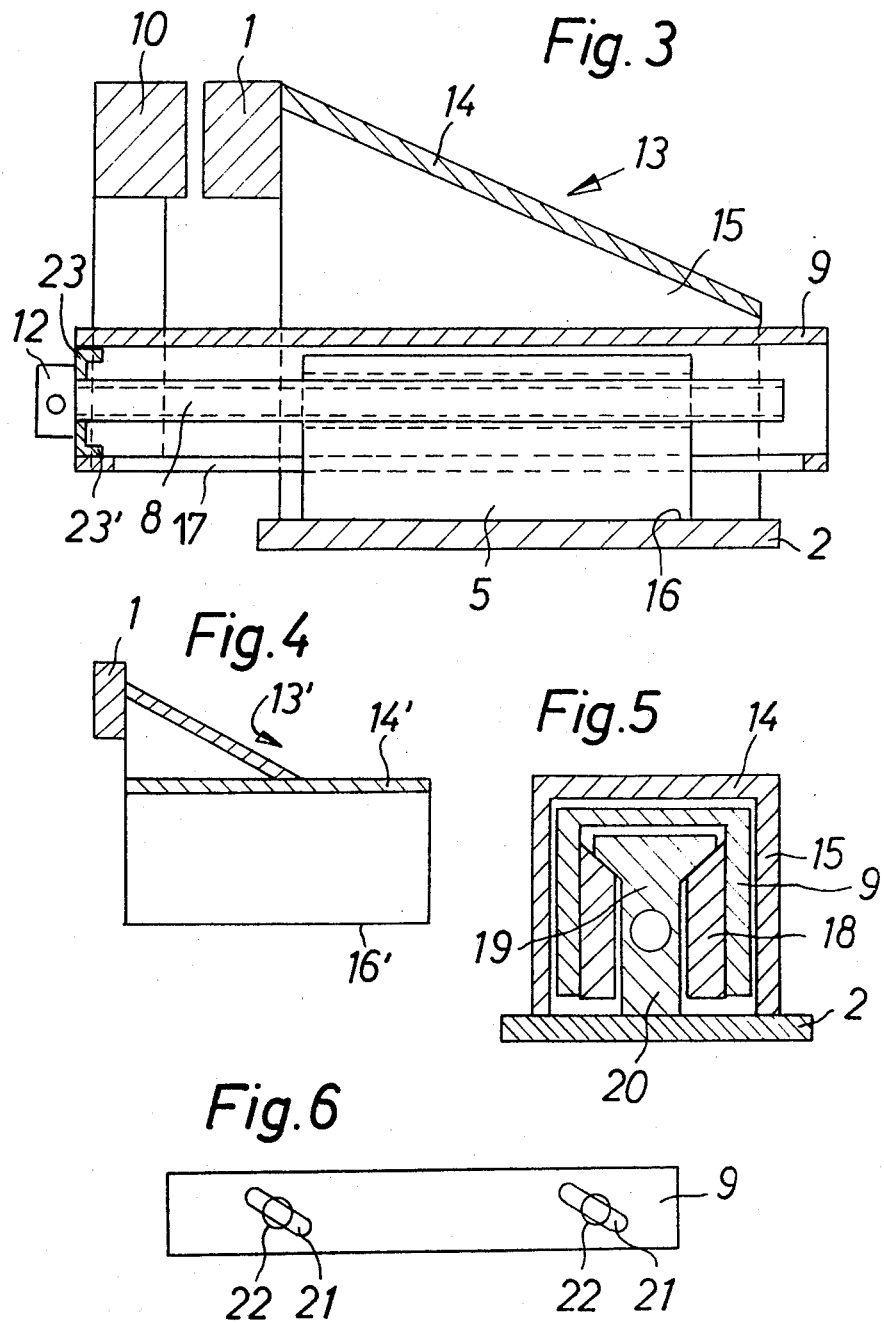

HEADSTOCK

This invention relates to a headstock with jaws guided parallel to one another, and with a spindle bearing by means of a drivable head on a fixed jaw, this spindle engaging in a spindle nut which is fixed relatively to the fixed jaw, the spindle nut being enclosed by a guiding tube.

The invention is based upon the problem of so constructing a headstock of this kind that the guide, with outstanding lubrication, is largely kept free from contamination, and furthermore is less stressed in wear by the clamping forces. This is attained, according to the invention, by the fact that the guiding tube is constructed with a slot, in which there engages a web of the spindle nut, which has guiding flanks for the wall surfaces of the slot in the guiding tube. The spindle nut preferably at least partially fills up the cross-section of the slotted guiding tube. In this way, by utilizing the web surfaces of the spindle nut as guiding flanks, the guiding cage that has hitherto been required becomes quite unnecessary. The guiding surfaces can now be considerably closer than hitherto to the spindle, so that the clamping forces exerted by the latter exert considerably diminished torques. According to the extent to which the spindle nut, with its external surfaces, fills up the cross-sectional area of the slotted guiding tube, one even arrives at a guidance which is completely symmetrical in relation to the axis of the spindle.

The spindle nut preferably extends throughout the entire length of the arrangement carrying the fixed jaw. The pressure-applying forces are therefore distributed over larger guiding areas, and the parallel movements of the headstock jaws are therefore more precise.

The slot in the guiding tube preferably opens downwards. This ensures that any contaminations falling down from above on to the guiding sleeve cannot be taken along into the guide.

The arrangement carrying the fixed jaw, in the part of it that accommodates the guiding tube, may be so constructed that it surrounds the external wall surface of the guiding tube with clearance. This not only saves the expense of machining the internal wall surface of the arrangement that carries the fixed jaw, but also prevents any contaminations that may adhere to the external surface of the guiding tube leading to jamming.

In order to keep the cost of maintenance small, the spindle nut consists at least partly of sintered material, provided with a lubricant, such as oil, or molybdenum sulphide.

The lubricating conditions admit of being further improved by employing self-lubricating synthetic substances, particularly on the internal surface of the guiding tube. Suitable synthetic substances are available to the technologist, and when these are employed, the frictional forces are thereby considerably reduced, so that operation is facilitated, which is of great importance just when adjustment has to be made to greatly varying clamping-jaw differences, or when use has to be made of the possibilities of quick-action clamping. This kind of lubrication has the further considerable advantage that in consequence of the abandonment of liquid lubricant, no dust or similar contaminations, which are unavoidable in workshop operation, can adhere to the exposed guiding surfaces of the guiding tube.

As will be easily realized, the adoption of this invention is possible even when the drivable spindle head engages a fixed jaw, and the spindle nut is stationary relatively to the movable jaw. In this case the guiding tube forms a unit with the arrangement carrying the fixed jaw, and penetrates into the arrangement carrying the movable jaw, to be likewise guided there by the spindle nut connected therewith.

For the further improvement of this headstock in relation to the protection of the guide from contamination and for a further reduction in the forces acting upon the guide, the arrangement carrying the fixed jaw is constructed with a cross-section of about the form of an inverted U, the web or bridge surface of which covers the guiding tube with a clearance of at least 2 mm., and the side or wing surfaces of which are just about vertical. The web surface is preferably slightly inclined to the guiding tube. In this way no contaminations such as are produced by machining or filing operations can settle on it. Above all, any jamming owing to the penetration of machining shavings or filings between the guiding tube and the arrangement carrying the fixed jaw is thus counteracted. Finally, this renders it possible to provide, with the web surface of the U-profile, a plane surface, which it may be helpful to use as an anvil or the like.

The arrangement carrying the fixed jaw accordingly admits of being advantageously bent from a sheet-metal blank of suitable thickness. It is however also possible to cut this arrangement out of a channel section by trimming its wing surfaces. In this way the conditions for systematic mass production are also fulfilled.

The arrangement carrying the fixed jaw is preferably connected, along its lower longitudinal edges, with a mounting plate, which also carries the spindle nut. This connection may for instance be effected by welding.

To enable a sufficient inclination to be given to the aforementioned inclined surface of the arrangement carrying the stationary jaw, while on the other hand also enabling the guiding tube that surrounds the spindle to cover it for a sufficient length, and also, if desired, to provide an additional but horizontal anvil surface, the said arrangement is mounted upon a rearwardly extended body, which is likewise constructed with a cross-section of about the shape of an inverted U, the web or bridge surface of which however extends horizontally, and which overarches the spindle nut, and is connected along its lower longitudinal edges with the mounting plate that carries the spindle nut.

For the further improvement of the slotted guiding tube, the slot may be closed at the end. In particular it may be closed at both ends. In this way the endwise penetration of contaminations into the guiding tube is prevented, while an increase in the stability of the same is provided, thus obviating the occurrence of stresses of irregular strength.

Further advantages arise when the guiding tube is of right-angled cross-section, both with respect to the cost of production, and from the point of view of a more uniform loading, and an improved moment of resistance to bending. The intensity of surface pressure of the guide is preferably further reduced by the fact that the guiding tube has an inverted U-shaped profile, there being secured, to the inner sides of the lateral or wing surfaces, wedge-pieces, which present guiding surfaces, along their upper edges, for an approximately T-shaped section, in the web of which the spindle nut is located.

It is also possible to provide a simple adjusting possibility by holding the wedge-pieces, by means of screws accessible from the exterior, in oblique slots in the wing surfaces of the guiding tube.

A possibility, advantageous more particularly for lighter forms of construction, of the further closure of the guiding tube, consists in providing, at its end adjacent to the spindle head, a closure plate connected fast therewith, and provided with a bore for the spindle. This closure plate may have wing surfaces which extend in the direction of the spindle, and can be readily secured to the corresponding surfaces of the guiding tube. The spindle head then no longer bears on a downwardly extended portion of the movable jaw, but directly upon the said closure plate. For the movable jaw, the guiding tube constructed with a rectangular cross-section also presents a noteworthy fastening possibility, in that the movable jaw is connected with the vertical surfaces of the guiding tube. The welding difficulties occurring with round guiding tubes are in this way obviated, while the connection is thereby even more secure, owing to the possibility of welding seams being provided on both sides of the carrying web of the jaw.

The invention will now be further described with reference to constructional examples illustrated in the accompanying drawings, in which:

FIG. 3 shows a further embodiment of the headstock according to the invention in side sectional elevation;

FIG. 4 shows a modified form of construction of the arrangement carrying the stationary jaw;

FIG. 5 shows a cross-section corresponding to FIGS. 3 or 4; and

FIG. 6 is a side view of the guiding tube.

Figure 1:
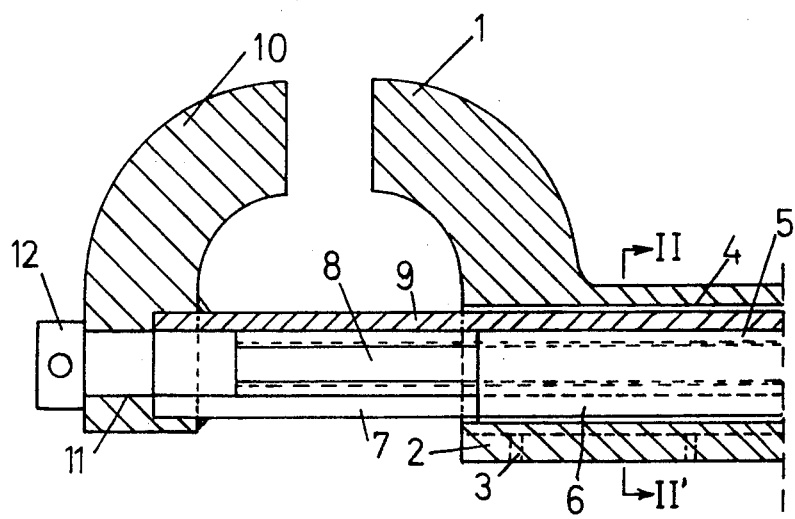
FIG. 1 shows a first embodiment of the headstock according to the invention in side sectional elevation.
Figure 2:
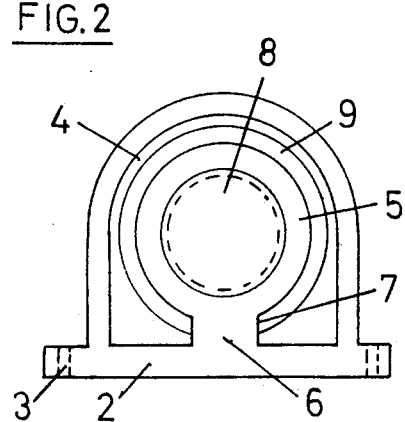
FIG. 2 shows an enlarged cross-section on the line II—II' in FIG. 1.

The diagrammatically illustrated parallel headstock consists of a stationary jaw 1, to be secured to a work bench or the like. The jaw 1 is connected with a mounting plate 2, in which there are mounting holes 3. The arrangement carrying the fixed jaw 1, as indicated by the view partially in section, has an internal aperture 4, in which an elongated spindle nut 5 is located. The latter is constructed with machined lateral web-wall surfaces 6, on which the flank surfaces 7 are guided in a slot in a guiding tube 9, which surrounds a spindle 8. The cross-section of the guiding tube 9 may in itself be of any desired shape, for instance rectangular, triangular or trapezoidal. It is particularly advantageous, however, to construct it as a round tube, which is either bent in such a way as to leave the slot free, or in which the slot is milled.

With the guiding tube 9 is connected the movable jaw 10 of the headstock. In the jaw 10 is provided an aperture 11 passing right through it for the spindle 8, which in its turn, with its head 12, engages an appropriately shaped bearing surface on the outside of the movable jaw 10.

According to FIG. 3, the fixed jaw 1 is connected frontally with the arrangement 13, which is constructed in the manner described in cross-section as an inverted U, and has a web surface 14 inclined in relation to the direction of the guiding sleeve 9. The vertically extending wing surfaces 15 are connected, along their lower edges 16, with the mounting plate 2. The mounting plate 2 carries the spindle nut 5, in which the spindle 8 is rotatably supported. The spindle nut 5 is surrounded by the guiding sleeve 9, which is of rectangular cross-section, and which has underneath a slot 17, which is likewise closed at both ends. Further, the spindle nut is arranged in the web of a T-profile 19, which is illustrated in more detail in FIG. 5.

As FIG. 4 shows, the arrangement 13' carrying the fixed jaw may also consist of a U-profile 14', on which is located an attachment, illustrated without a reference, which in turn carries the fixed jaw 1. The U-profile 14' is along its lower longitudinal edges 16' connected, in a manner not illustrated, with a base plate.

FIG. 5, which illustrates the cross-section of the aforementioned forms of construction, discloses in particular a guiding tube 9, the wing surfaces of which carry, on their inner sides, wedge-pieces 18, in cross-section which are so constructed on their upper edges as to form a guide for the T-section 19, which is connected fast with the mounting plate 2. In the web 20 of the T-section there is a nut, not further described, for the spindle 8.

In order to ensure, even after lengthy use, a firm bearing of the guide, and thus to preclude excessive local surface pressures, the wedge-pieces 18 are held, by means of screws 22 accessible from the exterior, in obliquely extending slot-like holes 23 in the guiding tube 9, and can thus be shifted higher up as required.

The front closure of the guiding tube 9 is formed by a plate 23, which bears against the spindle head 12, and which, with wing surfaces 23', is welded to the internal wall surface of the guiding tube 9. The movable jaw 10 has in its turn two downwardly directed webs, which are welded to the vertical surfaces of the guiding tube 9.

I claim:

1. A headstock, comprising: a fixed jaw and a movable jaw guided parallel to one another, a spindle nut which is stationary in relation to the fixed jaw, a spindle engaging in the spindle nut and having a drivable head which engages the movable jaw, and a guiding tube surrounding the spindle, the guiding tube being formed with a longitudinal slot, the spindle nut having a web which engages in the said slot, the flanks of said web being in guiding engagement with the wall surfaces of the said slot, the guiding tube being of right-angled cross-section, the guiding tube consisting of a channel bar open underneath, and the headstock further comprising: wedge-pieces secured to the internal surfaces of the lateral elements of the channel bar, and a substantially T-shaped member, the lateral elements of which are slidably guided on the upper edges of the wedge-pieces, the spindle nut being located in the web of the T-shaped member.

2. A headstock, comprising a fixed jaw and a movable jaw guided parallel to one another, a spindle nut which is stationary in relation to the fixed jaw, a spindle engaging in the spindle nut and having a drivable head which engages the movable jaw, a guiding tube surrounding the spindle, and a stationary member carrying the fixed jaw, said stationary member overarching the external surface of the guiding tube with clearance, the guiding tube being formed with a longitudinal slot, the spindle nut having a web which engages in the said slot, the flanks of said web being in guiding engagement with the wall surfaces of said slot, and the spindle nut at least partially filling up the internal cross-section of the guiding tube to form guide-means, the headstock also including a stationary member substantially in the form of an inverted U carrying the fixed jaw and covering the transverse upper portion of the guiding tube, with a clearance of at least 2 millimeters, the side portions of the U being substantially vertical.

3. A headstock as claimed in claim 2, in which the transverse upper element of the inverted U-shaped member carrying the fixed jaw is inclined to the longitudinal direction of the guiding tube.

4. A headstock as claimed in claim 2, wherein the member that carries the fixed jaw is bent out of a sheet-metal blank.

5. A headstock as claimed in claim 2, in which the member that carries the fixed jaw is cut out of a channel bar by trimming its lateral portions.

6. A headstock as claimed in claim 2, further comprising: a fixed mounting plate on which the spindle nut and the member carrying the fixed jaw are mounted.

7. A headstock as claimed in claim 6, further comprising a body of inverted U-shaped cross-section extending rearwardly beyond the rear end of the member that carries the fixed jaw, the transverse upper element of this inverted U-shaped member covering the spindle nut, and being connected along its lower longitudinal edges with the mounting plate that carries the spindle nut.

8. A headstock as claimed in claim 2, in which the slot in the guiding tube is closed endwise.

9. A headstock as claimed in claim 2, in which the slot in the guiding tube is closed at both ends.

10. A headstock as claimed in claim 1, in which the guiding tube is of a right-angled cross-section and consists of a channel bar open underneath, and the headstock further comprises: wedge-pieces secured to the internal surfaces of the lateral elements of the channel bar, and a substantially T-shaped member, the lateral elements of which are slidably guided on the upper edges of the wedge-pieces, the spindle nut being located in the web of the T-shaped member.

11. A headstock as claimed in claim 10, in which the wedge-pieces are adjustably secured to the lateral elements of the channel bar, by means of screws which pass through inclined slots in the channel bar, and which are accessible from the exterior.

* * * * *